Dec. 14, 1926.

W. WARD 1,610,906

SPALL KILN AND PROCESS OF BURNING LIME THEREIN

Filed Sept. 11, 1925   2 Sheets-Sheet 1

Inventor
Wilburt Ward
By Brown & Phelps
Attorneys

Dec. 14, 1926.  W. WARD  1,610,906
SPALL KILN AND PROCESS OF BURNING LIME THEREIN
Filed Sept. 11, 1925  2 Sheets-Sheet 2

Inventor
Wilburt Ward
By Browne & Phelps
Attorneys

Patented Dec. 14, 1926.

1,610,906

UNITED STATES PATENT OFFICE.

WILBURT WARD, OF STE. GENEVIEVE, MISSOURI.

SPALL KILN AND PROCESS OF BURNING LIME THEREIN.

Application filed September 11, 1925. Serial No. 55,714.

The invention relates to lime kilns, and has as an object the provision of a lime kiln provided with means to burn large lumps of lime stone in the usual manner, and in addition thereto to burn small lumps of lime stone known in the trade as "spalls".

It is a further object of the invention to provide a lime kiln which will burn spalls without direct contact of the stone or the resultant lime with products of combustion, whereby an especially pure form of lime may be secured.

It is a further object of the invention to provide a lime kiln having means to burn spalls by application of heat which is ordinarily wasted.

It is a further object of the invention to provide an improved process of burning lime utilizing heretofore wasted spalls and producing therefrom a superior grade of lime.

Further objects of the invention will appear from the following description when read in connection with the accompanying drawings, in which—

Figure 1:
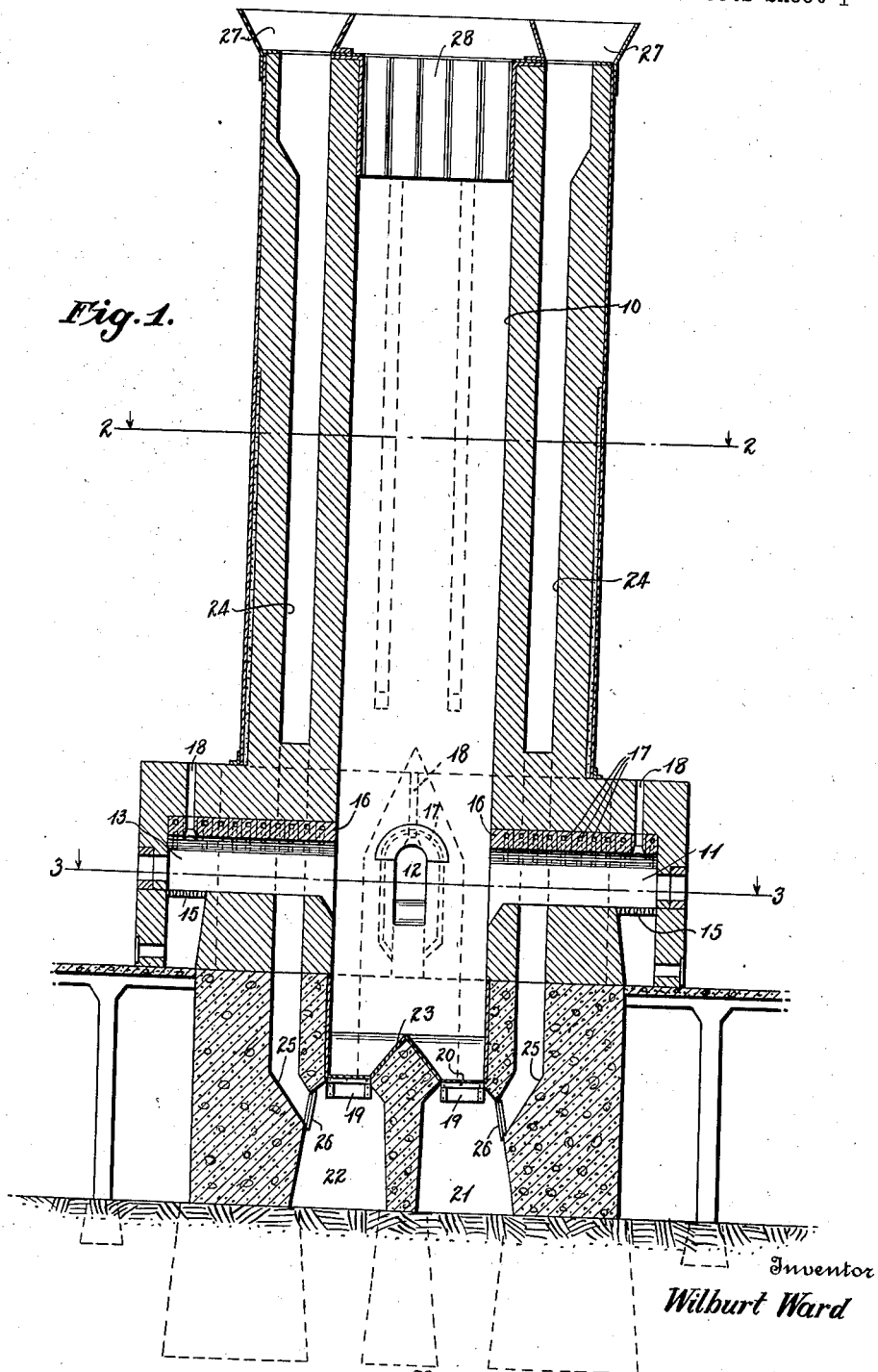

Fig. 1 is a central vertical section, and

Figure 2:
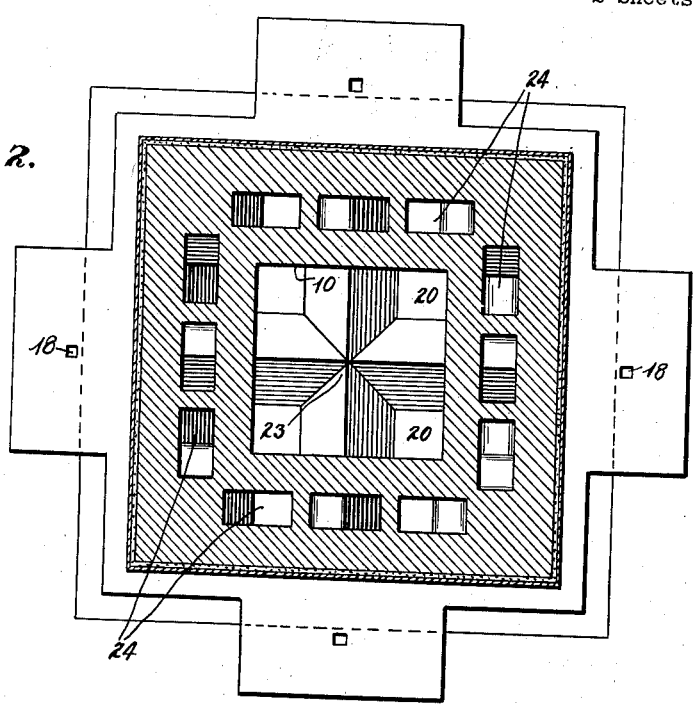
Figure 3:
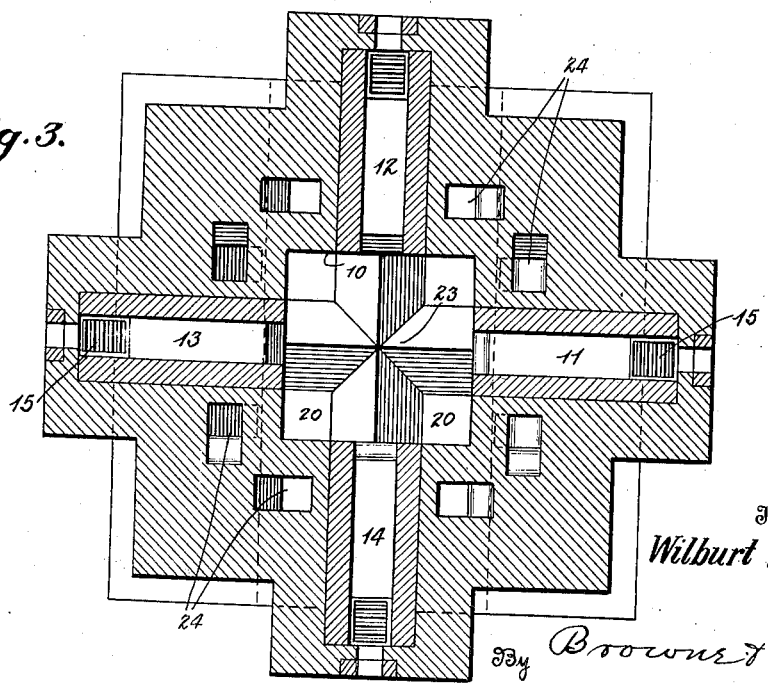

Figs. 2 and 3 are horizontal sections on lines 2, 2, and 3, 3 respectively.

As shown, the device comprises a central shaft 10 having a plurality of furnaces 11, 12, 13, 14, to provide heat for the burning of lime stone placed in the central shaft to the form of lime.

As shown, each of the furnaces is provided with a grate 15, and a furnace arch 16, the arch being provided with means for heating air of combustion, in the form of channels 17.

Means for admission of fuel to the grate 15 is shown at 18 in the form of vertical passages. The products of combustion from the furnaces is allowed to pass to the central stack 10, and to travel upwardly therein through the mass of broken lime stone, thereby to "burn" the lime stone to the form of quick lime in the well known manner.

To discharge the burned lime from the stack 10, there are shown openings 19 which are provided with any desirable form of closure 20, so that a cart may be driven into either of the passages 21, 22, and a closure 20 may be opened to allow the lime to be drawn off into the cart.

To deflect the burned lime to the openings a spreader is shown in the form of intersecting wedge shaped portions 23 to deliver the lime by gravity to the openings 19.

It is ordinarily impossible to burn the spalls with the large sized lime stone for the reason that the presence of the small pieces in the kiln would stop up the interstices between the large pieces, and thus make it impossible to secure sufficient draft through the kiln. The spalls are therefore usually thrown away as refuse.

To form a superior quality of lime from the waste material represented by the spalls, there is, according to the invention, a series of vertical passages 24, disposed about the central shaft 10. The material placed in these passages is thus caused to lie in contact with the wall of the central shaft 10, which walls are heated to a high temperature by the heat supplied to the material within the shaft. The heat which would therefore be ordinarily wasted is transferred to the spalls, and they are changed to lime without contact with products of combustion or other foreign matter.

To enable the resultant lime to be drawn off from the passages 24 their lower ends are deflected, as at 25, to openings into the passages 21, 22, suitable closures 26 being provided to control the discharge of material, which material may be received directly into the carts in the same manner as that from the central shaft 10.

To facilitate the feeding of material to the passages 24, hoppers 27 are shown at their upper ends. A protective skirting 28 is desirably placed about the material receiving opening of the shaft 10 to prevent abrasion of the walls of the shaft when material is discharged thereinto.

The kiln may be operated continuously, fully burned lime may be withdrawn from the lower end of the shaft 10 or from the passages 24, and new stone may be supplied at the top, as the material therein sinks downwardly, in the well known manner.

Minor changes may be made in the physical embodiment of the invention without departing from its spirit.

I claim:

1. A lime kiln comprising, in combination, a stack having a central passage to receive large pieces of lime stone, and a separate passage to receive smaller pieces of lime stone, a furnace to deliver products of combustion directly solely to said central passage, said separate passage so related to said central passage as to have its contents heated by conduction through a wall of the stack, a separate closure at the bottom of each of said passages whereby to retain material to be treated therein and to permit finished products to be selectively withdrawn therefrom.

2. A lime kiln comprising, in combination, a stack having a central shaft, furnaces to deliver heated products of combustion directly solely to the interior of said shaft to directly heat large pieces of lime stone placed therein, a series of smaller passages surrounding said shaft and formed in the walls of the stack adapted to have their contents heated by conduction through the walls of the stack, a separate closure at the bottom of each of said passages whereby to retain material to be treated therein and to permit finished products to be selectively withdrawn therefrom.

3. The process of burning lime which comprises placing relatively coarse broken lime forming material in a chamber, heating said material by passing heated products of combustion through said chamber in contact with said material, placing relatively fine broken lime forming material in a chamber in the wall of said first named chamber and heating said fine material solely by conduction of heat through said wall and entirely out of contact with products of combustion, whereby said fine material is changed to lime uncontaminated by products of combustion.

WILBURT WARD.